3,282,879
PROCESS FOR TREATING IMINATED VINYL ACETATE EMULSION POLYMERS WITH WATER-SOLUBLE BISULFITES

Ervin R. Werner, Jr., Levittown, Pa., assignor to E. I. du Pont de Nemours and Company, Wilmington, Del., a corporation of Delaware
No Drawing. Filed Oct. 27, 1964, Ser. No. 406,896
10 Claims. (Cl. 260—29.6)

This invention relates to a process for rapidly removing a residual dark color in latices and paints in which the polymeric component containing vinyl acetate units has been treated with an aziridine compound.

Simms U.S. Serial Number 379,718, filed July 1, 1964, teaches a novel process for formulating an "aminoester polymer latex" by reacting vinyl addition polymers having carboxylic acid groups or salts thereof with an aziridine compound.

The term "latex" designates an aqueous dispersion of a water-insoluble polymer which is present in the form of very fine particles.

The process of this invention is concerned in particular with vinyl addition polymers which consist of a "carboxylic polymer" having vinyl acetate units which are particularly useful film formers in outdoor or indoor paints.

"Carboxylic polymer" designates a substantially water-insoluble interpolymer containing pendant carboxyl groups (—COOH) or their salts (e.g., —COONH$_4$). These interpolymers are the product of at least one monomer containing both a carboxylic acid group (or an equivalent source of carboxyl groups) and polymerizable olefinic unsaturation that is polymerized with at least one other copolymerizable monomer, i.e., vinyl acetate, and preferably including another copolymerizable monomer.

To form a polymeric latex with adhesion and improved freeze-thaw stability, the aforementioned carboxylic polymer which has vinyl acetate units is reacted with an aziridine compound. The aziridine compound is often referred to as an alkylene imine and is a compound of the following formula:

Formula A

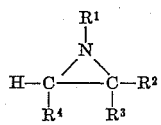

In Formula A, R$^1$ is H, benzyl, or a C$_1$ to C$_5$ alkyl radical, R$^2$ and R$^3$ are selected individually from the group consisting of H, benzyl, aryl and C$_1$ to C$_5$ alkyl radicals. R$^4$ is H or a C$_1$ to C$_5$ alkyl radical. R$^1$ should be H or a C$_1$ to C$_4$ alkyl radical when maximum dry film adhesion is desired.

The reaction between the aziridine compound and the aforementioned carboxylic polymer is herein referred to as an "imination reaction." Paints formulated from an "iminated latex," i.e., a latex which has been subjected to an imination reaction, in comparison to paints formulated from a latex which has not been treated with an alkylene imine, have improved freeze-thaw stability, show improved durability to weathering and have good adhesion to substrates in both the wet and dried state.

However, when reacting a carboxylic copolymer latex containing vinyl acetate units with an aziridine compound according to the aforementioned Simms process, the "aminoester polymer latex" resulting therefrom has a residual dark color, usually a coffee brown color. The dark color usually develops immediately during the imination reaction or shortly thereafter. This dark color in the latex makes the latex useless for paints, particularly light colored paints.

It is therefore an object of this invention to provide a method for rapidly removing the residual dark color resulting from the treatment of a carboxylic polymer containing vinyl acetate units with an alkylene imine.

In the process of this invention, a latex of a carboxylic polymer, which contains vinyl acetate units, is reacted with an alkylene imine. The aminoester polymer resulting therefrom has attached to the carbon atoms of the polymer backbone monovalent radicals of the following formulas:

and

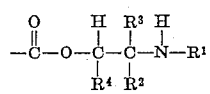

wherein R$^1$, R$^2$, R$^3$ and R$^4$ are as defined in Formula A. It is recognized that in the aminoester latex, aminoester radicals attached to the polymer backbone often acquire an hydronium ion. The positively charged aminoester group readily interacts with the pendant anionic carboxyl groups of the same polymer chain or other polymer chains to form an ion having both a positive and a negative charge. However, for purposes of this invention, the polymer is defined as above.

An important feature of this process is to treat the carboxylic polymer latex or the aminoester polymer latex with about 0.5–3% and preferably 1–2% by weight, based on the weight of the polymeric component, of a water-soluble bisulfite salt. This treatment of the carboxylic polymer latex prevents the formation of colored products by the subsequent imination reaction. The treatment of the iminated polymer provides for the rapid and complete removal of the colored products formed by the imination reaction. In either case, the treated latex has no residual dark color and is particularly useful in paints and other coating compositions.

Furthermore, even after a paint is formulated from a discolored iminated polymer latex, the paint can be treated by the process of this invention, i.e., with a bisulfite salt, to remove the residual color without adversely affecting the physical properties of the paint.

In a typical process, the bisulfite salt used to treat a discolored latex or paint to remove the residual dark color, or to prevent formation of the dark color in the latex or paint, is preferably in an aqueous solution or it can be used as a finely divided solid; in either form the bisulfite salt is thoroughly mixed with the discolored latex or paint either at room temperatures or preferably at 40–80° C.

Any water soluble bisulfite salt is operable in this invention. Alkali metal bisulfite salt, such as sodium bisulfite and potassium bisulfite, are very useful. Ammonium acid sulfite can also be used. Moreover, metabisulfites, such as sodium or potassium metabisulfites, are particularly useful in this invention. Metabisulfites, which may be considered anhydrides of the bisulfites, are formed by heating the bisulfite or their solutions. These metabisulfites have the following general formula:

$$M_2S_2O_5$$

wherein M is an alkali metal. Metabisulfites are as reactive as the bisulfites but are less hygroscopic and more stable in storage and shipment than the bisulfites, thereby making these compounds more practical to use in this invention.

To form the aminoester latex useful in this invention, a carboxylic polymer containing vinyl acetate units is iminated with an aziridine compound, also referred to as an alkylene imine. The resulting product is a latex of a carboxylic polymer having vinyl acetate units that has attached to the carbon atoms of the polymer backbone monovalent ester radicals and sufficient carboxyl radicals which give the polymer an overall negative charge.

The carboxylic polymer latex is prepared by known methods of emulsion polymerization wherein a carboxylic acid monomer is copolymerized in an aqueous medium with about 50-90% and preferably 70-85% by weight vinyl acetate monomer and preferably also with another copolymerizable monomer, such as ethylene, an alkyl ester of acrylic or methacrylic acid in which the alkyl group contains 1 to 12 carbon atoms, a conjugated diene having 4-10 carbon atoms, acrylonitrile, styrene, alkyl-substituted styrene, vinyl chloride, or a blend of two or more such monomers.

A wide variety of carboxylic acids are useful for providing carboxyl units to the polymer. It is usually best to use either methacrylic acid, acrylic acid, itaconic acid, crotonic acid or mixtures thereof as the monomer containing a carboxylic group. Other olefinically-unsaturated carboxylic acids possessing one or more olefinic carbon-to-carbon double bonds and one or more carboxyl groups can be used. Preferably, the carboxylic acid should contain at least one activated olefinic carbon-to-carbon double bond of a type which readily functions in an addition polymerization. That is, it should contain either (1) a double bond in the alpha-beta position with respect to a carboxyl group (—CH=CH—COOH), or (2) a double bond attached to a terminal methylene group (CH$_2$=C<).

The carboxyl groups can also be introduced into the essential interpolymer from a carboxyl-supplying reagent such as maleic anhydride or monosodium oxalate by the method disclosed in U.S. Patent 2,662,874 (e.g., in column 3, line 34, and column 4, line 8), or from a reagent containing groups hydrolyzable to carboxyl groups by the method disclosed in U.S. Patent 2,710,292.

Typical of the known methods of making a carboxylic polymer latex useful in the practice of this invention are those described in U.S. Patents 2,395,017, 2,724,707, 2,787,603, 2,868,752, 2,868,754, 2,918,391 and 3,032,521, the disclosures of which are incorporated herein by reference. Especially pertinent is the method described in U.S. 2,724,707, column 5, line 21, to column 6, line 60.

The emulsion used in preparing the carboxylic polymer latex is composed of the mixture of monomers, i.e., the aforementioned carboxylic acid monomer, vinyl acetate monomer and preferably another copolymerizable monomer along with suitable emulsification and suspension agents (surfactants) buffering agents for pH control and a free radical catalyst; for example, potassium persulfate, a peroxide such as hydrogen peroxide, a diazo compound such as azobisisobutyroamidine hydrochloride or a redox type such as persulfate-sulfite, or mixtures of such catalysts. Polymerization can be carried out in the presence of a free radical catalyst in a closed vessel in an inert atmosphere and under autogenous pressure or under artificially induced pressure or in an open vessel under reflux at atmospheric pressure. The temperatures of the polymerization can be varied from 0° C. or lower to 100° C. or higher, preferably, from 20° C. to 90° C., depending to a large degree upon the activity of the monomers and catalyst used and the molecular weight desired in the polymeric product.

The carboxylic polymer is produced in any molecular weight that is desired; usually the molecular weight is above 100,000 for polymers used as the film forming constituent of paints but even molecular weights of about a million and above are frequently used.

The carboxylic acid monomer is preferably added to the emulsion reaction mixture in an amount sufficient to result in a carboxylic polymer which will have an overall negative charge after about 0.01 to 2% but preferably 0.1-1.5% amino nitrogen (by weight of polymer) is introduced by the subsequent imination reaction. Generally, the carboxylic polymer after it is iminated should have an acid milliequivalent of about 0.001 to 3.0, preferably 0.05-2.3, and even more preferably about 0.1 to 1.0 milliequivalents per gram of polymer (dry basis). In the interest of obtaining a substantially water-insoluble carboxylic polymer and a stable latex product, it is usually best to add less than 10%, preferably less than 6%, acid monomer based on the total weight of monomer in the reaction mixture.

The acid content of the carboxylic polymer can be determined by separating the polymer from the aqueous phase, dissolving it in a solvent and titrating the resulting polymer solution with alcoholic KOH to a phenolphthalein end-point. The acid content can also be determined by complete chemical analysis of the polymer.

The novel aminoester polymer latex is prepared by reacting the carboxylic polymer in latex form with an aziridine compound (alkylene imine) of Formula A above. Ethylenimine (Formula B) and 1,2-propylenimine (Formula C) are particularly preferred aziridines, because of their relatively low cost and plentiful supply.

Formula B 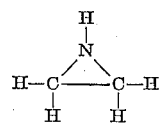

Formula C 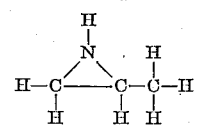

The aziridine compound is added to the carboxylic polymer latex in an amount equal to about 10 to 200% of the theoretical amount required to esterify all the pendant carboxyl groups of the carboxylic polymer but preferably 10 to 70% of the theoretical amount is used. When the aziridine compound is added to the carboxylic polymer latex, some hydrolysis of the aziridine compound occurs; therefore, the iminated latex also contains a small amount of the hydrolysis products of aziridine. The stability of the aminoester polymer latex that results from the imination reaction (esterification) tends to be enhanced by the presence of unreacted (non-esterified) carboxyl groups.

In a typical procedure for carrying out the imination reaction, the aziridine compound is mixed in a reaction vessel with the carboxylic polymer latex containing vinyl acetate units, and about 0.5 to 10% preferably of an anionic surfactant based on polymer weight. Preferably, the mixture is reacted at about 40 to 80° C. until imination is completed (e.g., about ½ hour at the higher temperature to about 12 hours at the lower temperature), and finally the reaction product is cooled to room temperature. The upper temperature limit is determined largely by how much heat the particular latex will withstand without coagulating. The entire reaction can be carried out at room temperature, but heating is generally preferred because of the shorter reaction time.

It is essential that the aqueous dispersion contain about 0.05 to 10% and preferably 1 to 6% by weight, based on the weight of the polymeric component, anionic surfactant or a mixture of nonionic and anionic surfactants. While any of the water-soluble anionic surfactants or mixtures of anionic and nonionic surfactants ordinarily used in aqueous emulsion polymerization techniques can be used, sodium lauryl sulfate is preferred as providing iminated polymer particles of optimum size. Soluble alkali metal and ammonium salts of half esters of sulfuric acids with long chain fatty alcohols can also be used, as can water-soluble polyalkylene oxide derivatives having an anionic group. Other anionic surfactants which can be used include alkyl aryl sulfonates, sulfated and sulfonated esters and ethers and alkyl sulfonates. Numerous additional species of anionic surfactants and nonionic surfactants useful in this invention are listed in "Synthetic Detergents" by J. W. McCutcheon, published annually by MacNair-Dorland Company, New York.

It is also essential that for use in coating compositions, i.e., the indoor or outdoor paints, the aqueous dispersions of this invention have a pH of at least about 7 and up to about 10. This pH can be attained by addition of a suitable base to the imination reaction product mixture. Ammonia is preferred and convenient to use for this purpose but amines and alkaline materials such as KOH and NaOH can be used. When the dispersion is to be used in a paint composition, a pH of 7–8 is preferred and is obtained by addition of ammonia to the iminated polymer latex.

To form a pigmented coating composition, any of the ordinary water-insoluble inorganic and organic paint pigments well known in the art can be mixed with the aminoester latex, either before or after treatment with the bisulfite salt. However, the relative amount and type of pigment in the latex binder has significant effect on the properties of the paint. A pigment volume concentration of about 10% is about the minimum proportion of pigment which will provide a paint which has a practical hiding power. The maximum proportion of pigment volume concentration is about 50%. Preferably, however, a pigment volume concentration in the range of 25–40% is desirable. Pigment volume concentration is the ratio expressed on a percent basis of the volume of pigment to the total volume of pigment plus film forming materials of the compositions; the "volume of pigment" is the volume of vehicle displaced by the pigment wet with vehicle.

Various additives or modifiers known to be useful in these coating compositions are added to the aminoester polymer latex either before or after treatment with the bisulfite salt, for example, other polymers in finely divided form, fillers, anti-freeze agents, plasticizers, stabilizers, odor controlling agents, fungicides, and flow controlling agents (e.g., thickeners).

The examples which follow are given for the purpose of illustrating the invention. All quantities shown are on a weight basis unless otherwise indicated. The water listed in the formulas is deionized water.

EXAMPLE 1

An aminoester polymer latex is prepared by a first forming the following latex of a carboxylic polymer having vinyl acetate units:

| | Parts by weight |
|---|---|
| Portion 1: | |
|   A solution of 8 parts sodium lauryl sulfate dissolved in 21 parts water | 29 |
| Portion 2: | |
|   Vinyl acetate monomer | 576 |
|   2-ethylhexyl acrylate monomer | 192 |
|   Crotonic acid solution (90% aqueous solution) | 35 |
| Portion 3: | |
|   Water | 78.85 |
|   Potassium persulfate | 4.15 |
| | 915.00 |

Each portion is premixed before it is added. Portion 1 is charged into a conventional polymerization vessel equipped with stirrer, thermometer, condenser, and means to introduce nitrogen and reagents. The following polymerization reaction is carried out under nitrogen. Portion 1 is heated to 80° C., 10% of Portion 2 and about 40% of Portion 3 are added simultaneously with stirring and while keeping the contents of the vessel at about 80° C. The remainder of Portion 2 and about 50% of Portion 3 are added gradually and simultaneously over a period of 3 hours while keeping the contents of the vessel at about 80° C. Then the remainder of Portion 3 is added while the temperature of the mixture is maintained at about 80° C. for 30 minutes. The resulting carboxylic polymer latex is cooled to 25° C. and is filtered through cheesecloth to remove any coarse coagulum that has formed.

The resulting latex has a 53% solids content and has a polymer composition of 72:24:4 of vinyl acetate:2-ethylhexyl acetate-crotonic acid.

Latex A formulation

A reaction vessel equipped with stirrer, thermometer, condenser and addition funnel is charged with 500 parts of the above carboxylic polymer latex and the contents are heated to about 45° C. About 4.3 parts ethylenimine are added gradually with continuous stirring and the mixture is reacted at 45° C. for about 30 minutes. The resulting iminated carboxylic latex is cooled to room temperature. After standing about 12 hours, the latex turned a dark coffee brown color. Paints formulated from this dark colored latex contained an undesirable dark tint even when heavily pigmented.

Latex B formulation

A reaction vessel equipped with stirrer, thermometer, condenser and addition funnel is charged with 400 parts of the above carboxylic polymer latex and the contents are heated to about 45° C. About 20 parts of a 20% aqueous solution of sodium bisulfite are gradually added with continuous stirring. Then about 3.4 parts of ethylenimine are gradually added with continuous stirring and the mixture is reacted at 45° C. for approximately 30 minutes. This iminated polymer latex is cooled to room temperature and remained a clear white latex color after several days. The physical properties, such as tensile strength and elongattion, of the latex containing the bisulfite salt compared to the aforementioned latex A, which does not contain the bisulfite salt, are very similar.

Moreover, paints formulated from latex B have acceptable color, i.e., no discoloring tint as occurred with paints formulated from latex A, have good adhesion, particularly to wood substrates, and have excellent weathering properties.

EXAMPLE 2

About 200 parts of the discolored latex A of Example 1 were charged into a reaction vessel and heated to about 45° C. About 2 parts of finely divided sodium bisulfite salt were gradually added with continuous stirring. The mixture is reacted at 45° C. for about 30 minutes.

After the reaction, the dark coffee brown color was not present and the color did not return even after the latex was allowed to stand several days. Paints formulated from this latex have an acceptable color, i.e., no discoloring tint is present, good adhesion to wood substrates and excellent weathering properties.

EXAMPLE 3

The following pigment dispersion is formulated:

| | Parts by weight |
|---|---|
| Titanium dioxide pigment | 190 |
| Talc extender pigment | 58.3 |
| Calcium carbonate | 58.3 |
| Water | 137.5 |
| Antifoam agent, "Nopco" 1497V | 2.5 |
| Potassium tripolyphosphate | .9 |
| Phenyl mercury propionate | 3.1 |
| 2% aqueous solution of hydroxyl ethyl cellulose | 1.7 |
| Ethylene glycol | 10.8 |
| | 463.1 |

"Nopco" 1497V is understood to be composed of 60% anionic sulfate saturated fatty acid, 8% free fatty acid, and 32% inert matter. The titanium dioxide is an 82:18 blend of rutile and anatase types.

The above compounds are introduced into a ball mill and uniformly blended in accordance with conventional procedures for making pigment dispersions for use in latex paints.

About 150 parts of the above pigment dispersion are charged at room temperature into a mixing vessel and about 5 parts carbitol are gradually added to the pigment dispersion with constant stirring. About 115 parts of discolored latex A of Example 1 are added to the vessel with constant stirring.

The resulting paint has a pigment volume concentration of about 35%, a pH of about 8.0, and a density of about 11.4 pounds per gallon and a viscosity of about 85 Krebs units. However, the paint still has a brown tint resulting from the discolored latex A.

About 1.4 parts of sodium bisulfite are gradually added to the above discolored paint with constant stirring and the paint is agitated for about 30 minutes. The dark brown tint in the paint disappeared leaving a white paint that does not discolor even after several months, and has excellent adhesion to wood substrates and good weathering properties.

I claim:
1. In the process for forming an aqueous dispersion suitable for use as a coating composition which comprises (A) reacting an alkylene imine with a polymeric latex consisting essentially of a vinyl addition polymer containing vinyl acetate units to form a polymer having attached to the carbon atoms of the polymer backbone monovalent radicals of the formulas and

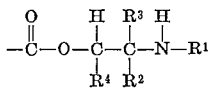

wherein $R^1$ is selected from the group consisting of hydrogen, benzyl and $C_1$ to $C_5$ alkyl radicals, $R^2$ and $R^3$ are selected individually from the group consisting of hydrogen, benzyl, aryl, and $C_1$ to $C_5$ alkyl radicals, and $R^4$ is selected from the group consisting of hydrogen and $C_1$ to $C_5$ alkyl radicals; said latex containing about 0.05–10% based on the weight of the polymer of a surfactant of the group of anionic surfactant and a mixture of anionic and nonionic surfactants, and said polymer having an amino nitrogen content of about 0.01–2% by weight and an acid equivalent of about 0.05–2.3 milliequivalents per gram per polymer; the improvement in combination therewith comprising (B) treating said polymeric latex with about 0.5–3% by weight, based on the weight of the polymer, of a water-soluble bisulfite salt, said steps A and B being carried out in any order.

2. The process of claim 1 in which said aqueous dispersion has a pH of about 7–10.

3. The process of claim 1 in which 1–2% by weight, based on the weight of the polymer, of a water-soluble alkali metal bisulfite salt is used for treating said polymeric latex.

4. The process of claim 1 in which 1–2% by weight, based on the weight of the polymer, of a sodium bisulfite is used for treating said polymeric latex at a temperature of 40–80° C.

5. The process of claim 1 in which $R^1$, $R^2$, $R^3$ and $R^4$ are hydrogen.

6. The process of claim 1 in which $R^1$, $R^3$, and $R^4$ are hydrogen and $R^2$ is methyl.

7. The process of claim 1 in which said vinyl addition polymer consists essentially of units of an alpha-beta-unsaturated monovinylidene carboxylic acid, units of vinyl acetate, and units of a $C_2$–$C_{16}$ copolymerizable monomer.

8. The process of claim 1 in which said vinyl addition polymer consists essentially of units of crotonic acid, units of vinyl acetate, and units of an acrylic acid ester of a $C_2$–$C_8$ saturated aliphatic monohydric alcohol.

9. The process of claim 2 in which said aqueous dispersion has pigment dispersed therein in the proportion of 10–50% pigment volume concentration.

10. In the process for forming an aqueous dispersion suitable for use as a pigmented coating composition containing pigment in the proportion of 10–50% pigment volume concentration and having a pH of about 8–10 which comprises (A) reacting an alkylene imine with a polymeric latex consisting essentially of units of an alpha-beta-unsaturated monovinylidene carboxylic acid, units of vinyl acetate, and units of acrylic acid esters of $C_2$ to $C_8$ saturated aliphatic monohydric alcohol to form a polymer having attached to the carbon atoms of the polymer backbone monovalent radicals of the formulas

and

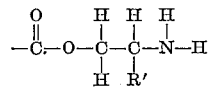

wherein $R'$ is selected from the group consisting of hydrogen and methyl; said latex containing about 1–6% anionic surfactant based on the weight of the polymer, and said polymer having an amino nitrogen content of about 0.1–1.5% by weight and an acid equivalent of about 0.1–1% milliequivalents per gram of polymer; the improvement in combination therewith comprising (B) treating said polymeric latex with about 1 to 2% by weight, based on the weight of the polymer, of water-soluble alkali metal bisulfite salt at a temperature of about 40–80° C., said steps A and B being carried out in any order.

References Cited by the Examiner

UNITED STATES PATENTS

| 2,868,752 | 1/1959 | Frazier et al. | 260—29.6 |
| 3,077,427 | 2/1963 | Hamermesh et al. | 161—251 |
| 3,113,038 | 12/1963 | Lattarulo et al. | 117—140 |

FOREIGN PATENTS

| 963,321 | 7/1964 | Great Britain. |

References Cited by the Applicant

UNITED STATES PATENTS

| 2,341,413 | 2/1944 | Pense et al. |
| 2,813,083 | 12/1957 | Craemer. |
| 2,915,480 | 12/1959 | Reeves et al. |
| 2,940,889 | 6/1960 | Justice. |
| 2,949,386 | 8/1960 | Cassel. |
| 3,017,280 | 1/1962 | Yudelson. |

MURRAY TILLMAN, *Primary Examiner.*

SAMUEL H. BLECH, *Examiner.*

W. J. BRIGGS, *Assistant Examiner.*